July 17, 1934.  P. M. MILLER  1,966,824
AUTOMOBILE WHEEL
Filed April 29, 1930

Inventor
PHILIP M. MILLER
By Richey & Watts
Attorneys

Patented July 17, 1934

1,966,824

UNITED STATES PATENT OFFICE 1,966,824

AUTOMOBILE WHEEL

Philip M. Miller, Youngstown, Ohio, assignor to Miller Devices Inc., New York, N. Y., a corporation of New York Application April 29, 1930, Serial No. 448,341

5 Claims. (Cl. 301—5)

This invention relates to wheels for motor vehicles, and the primary object of the same is to provide an artillery-type wheel comprised of metal parts which when assembled constitute a relatively light yet strong and rugged wheel of hollow ventilated construction and of attractive symmetrical appearance.

Another object is to provide a motor vehicle wheel of the cast metal artillery spider type which may be made relatively light in weight without sacrificing strength necessary to withstand hard road service, and thereby adapt the wheel for both light and heavy duty vehicles.

Another object is to provide a particular type of hub and nave construction which when used with a wheel assembly embodying a cast metal spider member permits the use of an artillery spider of modern design embodying a minimum amount of metal without sacrificing strength.

The foregoing and other objects and advantages will become apparent in view of the following description taken in conjunction with the drawing, wherein.

Figure 1:
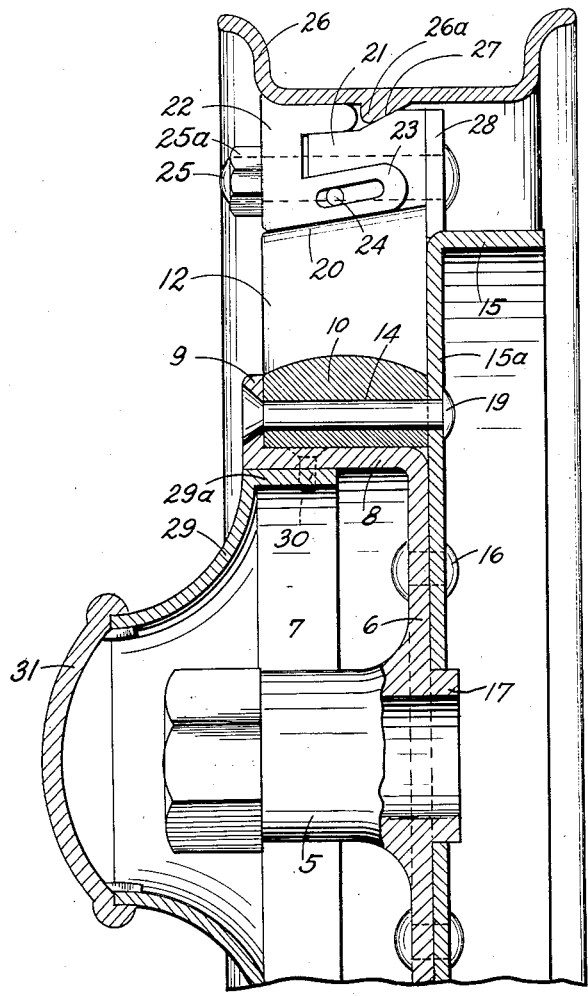
Figure 1 is a substantially central transverse sectional view of the greater portion of a wheel embodying the features of the present invention.
Figure 4:
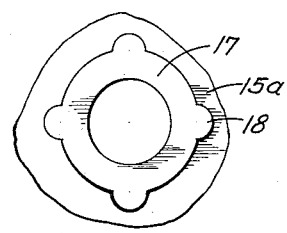
Fig. 4 is a fragmentary view in inboard side elevation of the wheel hub and adjacent web wall of the brake drum, showing a method of keying the drum to the hub.

The central or nave portion of the wheel is of open construction, and to provide such open type of nave member, the hub barrel 5 is transversely extended and at its inboard extremity said barrel is formed with a disk like wall 6 which is extended radially to provide a relatively large open central cup shaped chamber 7. At its radial outer extremity, the wall 6 is turned and extended transversely to provide a spider-supporting ledge 8. The ledge or wall 8 merges at its outboard side with a radially extended bolting flange 9.

Figure 2:
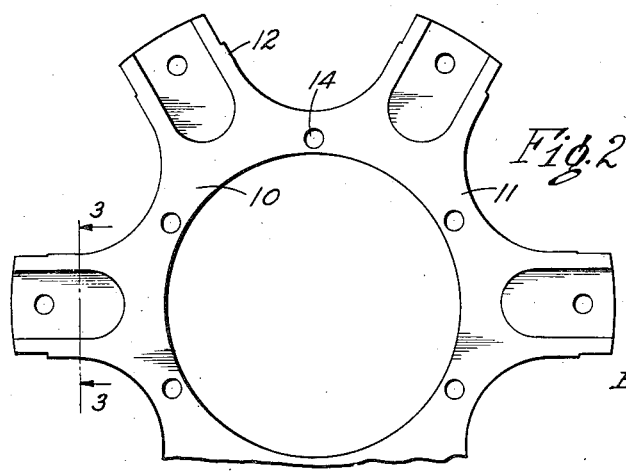
Fig. 2 is a detail view in inboard side elevation of a preferred type of spider member.
Figure 3:
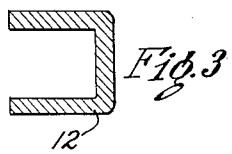
Fig. 3 is a sectional view of one of the spokes of the spider taken on the line 3—3, Fig. 2.

The central or nave portion of the wheel is particularly adapted for cast metal spider members, since it permits the use of a spider member embodying a minimum amount of metal in the production thereof. The preferred form of spider member is shown in detail in Fig. 2. The central or body wall of the spider member is indicated at 10 and is formed with an opening of a diameter such as will provide a relatively snug telescoping fit on the transverse wall or ledge 8. The peripheral portion of the body 10 is arched as at 11 and projected radially in the form of relatively short projections 12 which define the spokes of the wheel. The spokes 12 are preferably of channel shape in cross section, as particularly shown in Fig. 3. A series of bolt holes 14 are formed transversely through the body 10 of the spider member. The spider member, due to its skeleton construction which is permitted by the use of the particular type of hub and nave member above described, may be made relatively light in weight and embodying a minimum amount of metal.

While any particular type of brake drum may be used, it is preferred to use a drum having a web wall which is keyed to the hub of the vehicle. The drum, as indicated at 15, is provided with a web wall 15a which is preferably secured to the radial disk like wall 6 by rivets or analogous means 16. The rear extremity of the hub barrel 5 terminates in an annular shoulder 17 which is formed with one or a plurality of keying projections or lugs 18 adapted to engage in suitable recesses formed in the web wall 15a of the brake drum, by means of which the latter is rigidly keyed to the hub of the vehicle.

To secure the spider member against displacement, suitable rivets or bolts 19 are passed through the bolting flange 9, bolt holes 14 and web wall 15a of the drum 15. While any type of rim-mounting means and tire rim may be used with the present type of wheel, I prefer to use the type of rim mount disclosed in my copending application Serial No. 375,726, filed July 3, 1929. Referring briefly to this construction, it will be noted that the side walls of each spoke are formed with inclined ledges or shoulders 20, and beyond this point the spoke end terminates in a transversely inset clamp-receiving portion 21 adapted for sliding engagement with a clamp member 22 formed with side arms 23 which ride on said ledges or shoulders 20. The side arms are slotted and a pin 24 is inserted through the end portion 21 of the spoke and engages in the slots formed in said arms. A locking bolt 25 and lock nut 25a are fixed in the spoke end and are adapted to engage and lock the clamp member 22 in clamping position. The rim 26 is provided with an annular bead 26a adapted to fit on an inclined locking portion 27 of the spoke end to insure against displacement of the rim with respect to the spider member when the clamp member 22 is in locking position. It will be seen that when the lock nuts 25a are released, the clamp member 22 may be moved outwardly and downwardly until it reaches a point which will permit the rim to clear the spoke end. With this type of rim mount, the locking members 22 always remain in association with the ends of the spokes.

To prevent foreign substances, such as mud, dirt, sand and the like from entering into the hollow channels of the spokes, spoke covering members 28 are provided and are adapted to fit against the inboard side walls of each spoke, said cover members also serving as an anchor for the bolts 25. At their radial inner ends, the members 28 fit snugly against the brake drum 15 and together with the latter provide a complete closure for the open channels of the spokes. It will be understood that the members 28 could be made in the form of projections welded or otherwise secured to the brake drum.

To complete the symmetrical contour of the wheel and to close off the hollow central nave area 7, a shell member 29 formed with an annual peripheral wall 29a is telescoped into the central cup shaped chamber 7 in engagement with the transverse ledge or wall 8 and is preferably secured to said wall by means of rivets or like members 30. At its outboard side, the shell member 29 is given a substantially frustroconical shape, and on the extreme outer end of said shell member a cap 31 is frictionally engaged.

From the foregoing, it will be seen that I have provided a wheel having a central or nave construction which permits the use of a spider member embodying a minimum amount of metal and having relatively short artillery type spokes following the modern trend of design, and due to the fact that a minimum amount of metal may be employed in the spider member, the weight of the wheel may be readily reduced to a point where it can be used for a light duty or passenger vehicle without sacrificing the strength necessary to permit the wheel to withstand road service. Since the spokes are also hollow, the wheel as a whole is ventilated throughout, with the result that heat generated by friction when in service on the road is rapidly dissipated. When viewed from the exterior, the wheel presents an attractive appearance and has symmetrical lines.

It will be understood that certain modifications and variations in structure may be adopted from the scope of the invention as defined by the appended claims.

Having thus described my invention, what I desire to secure by Letters Patent is:

1. In a metal wheel assembly for motor vehicles, a hub formed with a transversely flanged wall forming a cup with the hub in the center of the cup and surrounded by the flange of said wall, a spider member formed with radial projections defining the spokes of the wheel adapted to be fitted on the outer side of said flange, and a shell member adapted to be fitted into the inner side of said flange around the end of the hub.

2. In a metal wheel assembly for motor vehicles, a hub merging at its inner side into a transversely flanged wall forming a cup with the hub in the center of the cup and surrounded by the flange of said wall, a spider member formed with radial projections defining the spokes of the wheel fitted on the outer side of said flange and a shell member fitted on the inner side thereof and converging outwardly around the end of the hub, and a cap adapted to be fitted on said shell member, closing the cup.

3. A metal wheel assembly for motor vehicles, comprising a hub which merges at its inner side into a transversely flanged wall forming a cup, said transverse flange terminating in a radial flange, a spider member adapted to be cast as an integral unit and formed with channeled projections defining the spokes of the wheel, said spider being adapted to be fitted on said transverse hub flange, a drum member adapted to be fitted against said hub wall and said spider over the open channels of said spokes and having a driving connection with said hub, and securing bolts passed through said radial flange, spider and drum and holding the parts together as a unit.

4. In a metal wheel assembly for motor vehicles, a hub formed with a radially extending transversely outwardly flanged wall forming a relatively large hollow chamber with the hub in the center of the chamber and surrounded by the flange of said wall, said transverse flange merging into a radially extending flange, a brake drum, a spider member fitted on said transverse flange against said radial flange and secured to the latter and said drum, and a cover member telescoped into said transversely flanged portion of said hub wall and extending outwardly around the hub and closing said chamber.

5. A metal wheel assembly for motor vehicles comprising a hub barrel provided at the inboard side thereof with a disc like wheel-supporting wall which is extended radially and turned transversely outwardly at its periphery around said barrel, the said disc like wall being of such radial extent as will define a cup-shaped wheel-supporting member having a relatively large hollow central nave area, a cast metal spider member having a body wall formed with a diametrically normal central opening of a diameter such as will provide a snug telescoping fit on said transversely extended wall and relatively short channel-shaped projections defining the spokes of the wheel, and a drum member having its web secured to the body of the spider member and said supporting wall.

PHILIP M. MILLER.